Sept. 23, 1947.  H. H. ROBY ET AL  2,427,813
ELECTRICALLY OPERATED PITCH CONTROL MECHANISM
Filed Dec. 6, 1945  5 Sheets-Sheet 1

INVENTORS.
Horace H. Roby
Gomer W. Jones
BY
ATTORNEY.

Sept. 23, 1947.   H. H. ROBY ET AL   2,427,813
ELECTRICALLY OPERATED PITCH CONTROL MECHANISM
Filed Dec. 6, 1945   5 Sheets—Sheet 2
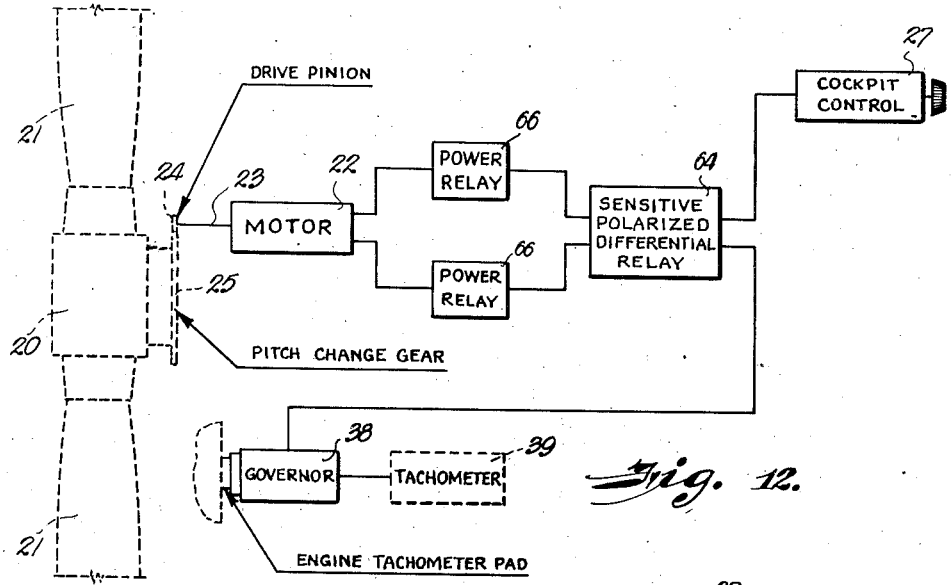
Fig. 12.
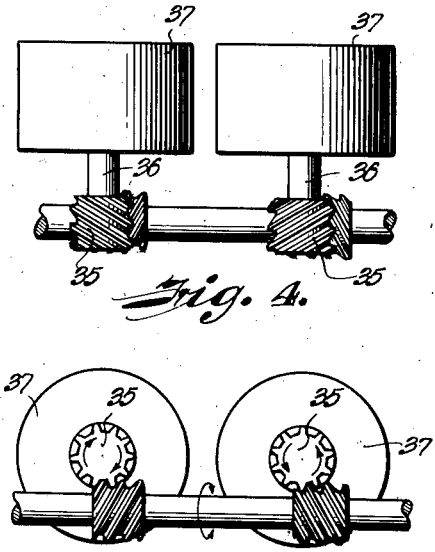
Fig. 4.
Fig. 5.
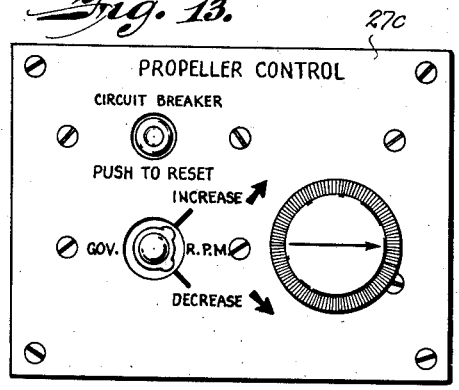
Fig. 13.
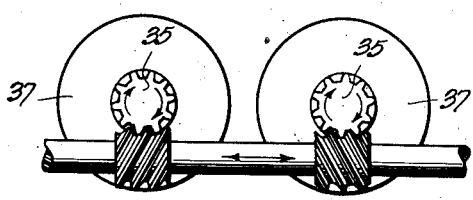
Fig. 6.
INVENTORS.
Horace H. Roby
Gomer W. Jones
BY
ATTORNEY.

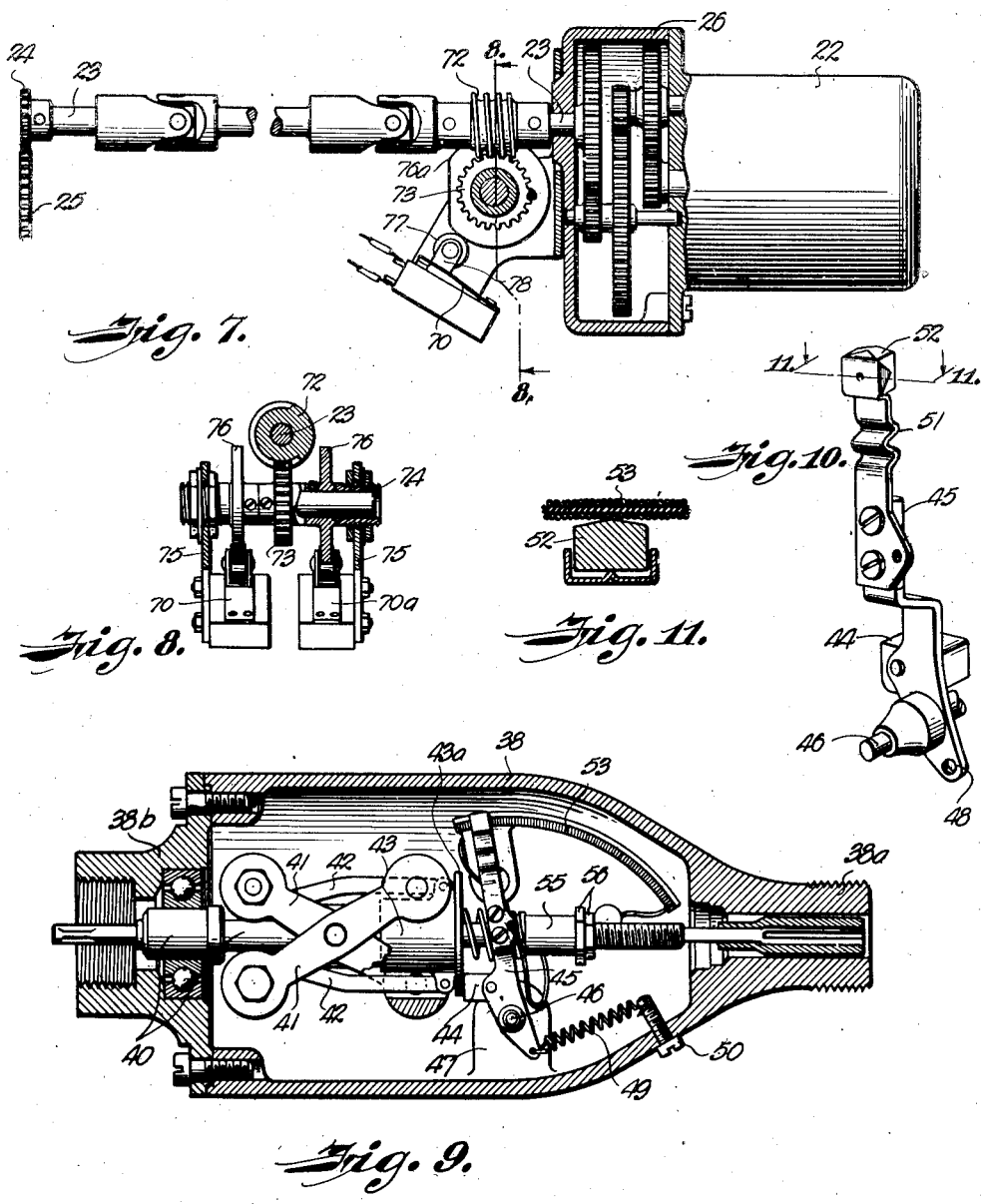

Patented Sept. 23, 1947

2,427,813

UNITED STATES PATENT OFFICE 2,427,813

ELECTRICALLY OPERATED PITCH CONTROL MECHANISM

Horace H. Roby and Gomer W. Jones, Wichita, Kans., assignors to Beech Aircraft Corporation, a corporation of Delaware Application December 6, 1945, Serial No. 633,227

2 Claims. (Cl. 170—163)

This invention relates to improvements in an electrically operated pitch control mechanism and refers more particularly to an electrical circuit with associated mechanical devices which will change the pitch of an airplane propeller and synchronize it with the engine speed in accordance with the pilot's preference, selected manually from the cockpit or instrument board.

A difficulty constantly encountered in piloting a plane using an internal combustion engine and equipped with a variable pitch propeller is to obtain maximum efficiency of the power source by properly varying the propeller pitch with the different engine speeds when taking off, cruising and landing the plane. The pilot must also be constantly alert when operating a multiple engine plane to maintain the engine speeds and pitch of the different propellers properly synchronized. It is to assist in these difficulties that the present circuit and mechanism has been devised.

An object of the invention is to provide an electric circuit substantially automatic in its operation which varies the engine speed and propeller pitch automatically and practically simultaneously with but little lag in the adjustment.

Another object is to provide a circuit by which the pilot, through a manual speed control, substantially simultaneously regulates engine speed and synchronizes the propeller pitch therewith.

A further object is to provide an anti-hunt circuit and limiting switches within the main control circuit which prevent over-run of the propeller pitch motor by cutting the motor circuit at the limits of pitch control.

Other and further objects of the invention will appear from the following description.

Figure 1:
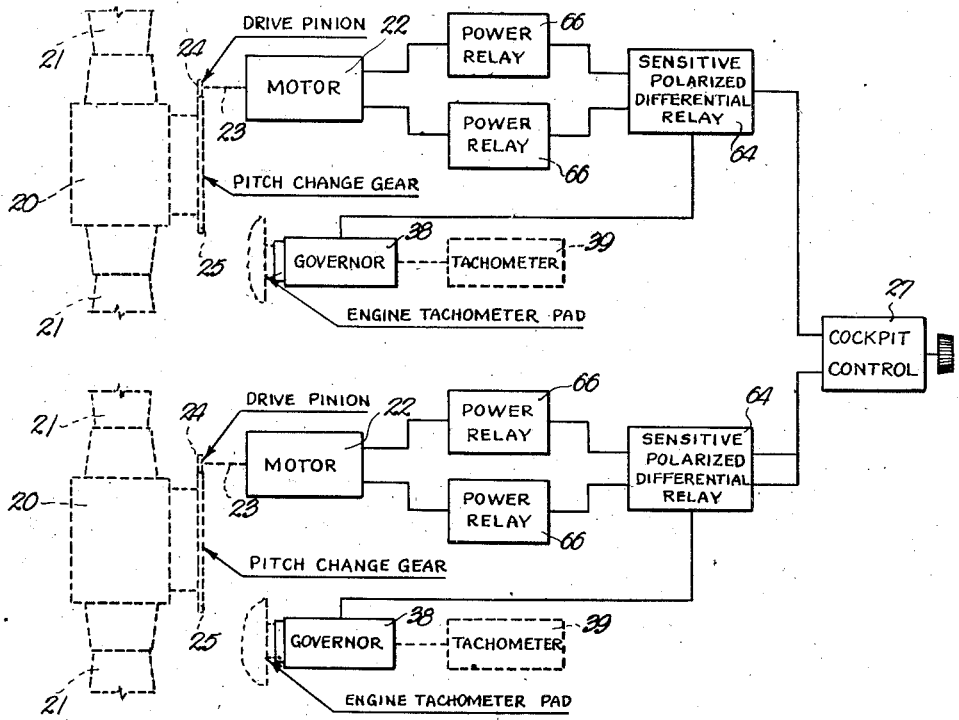
Figures 2, 3:
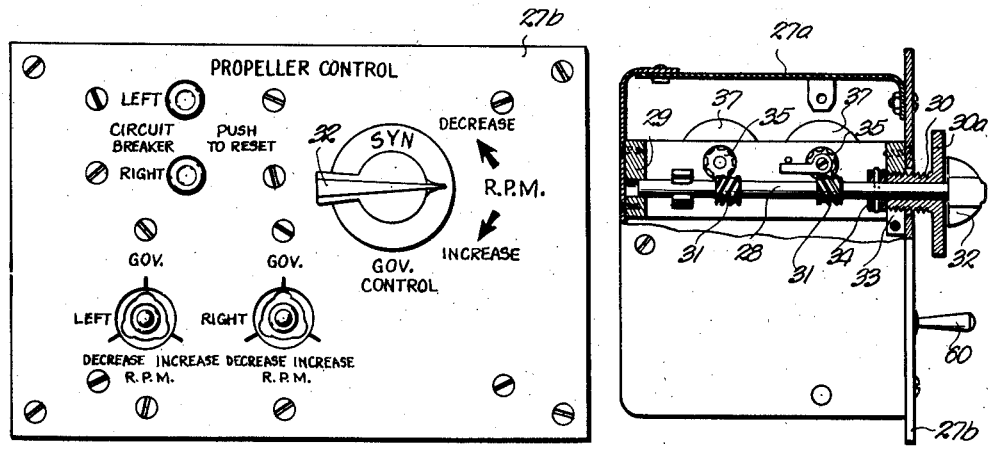
Figure 14:
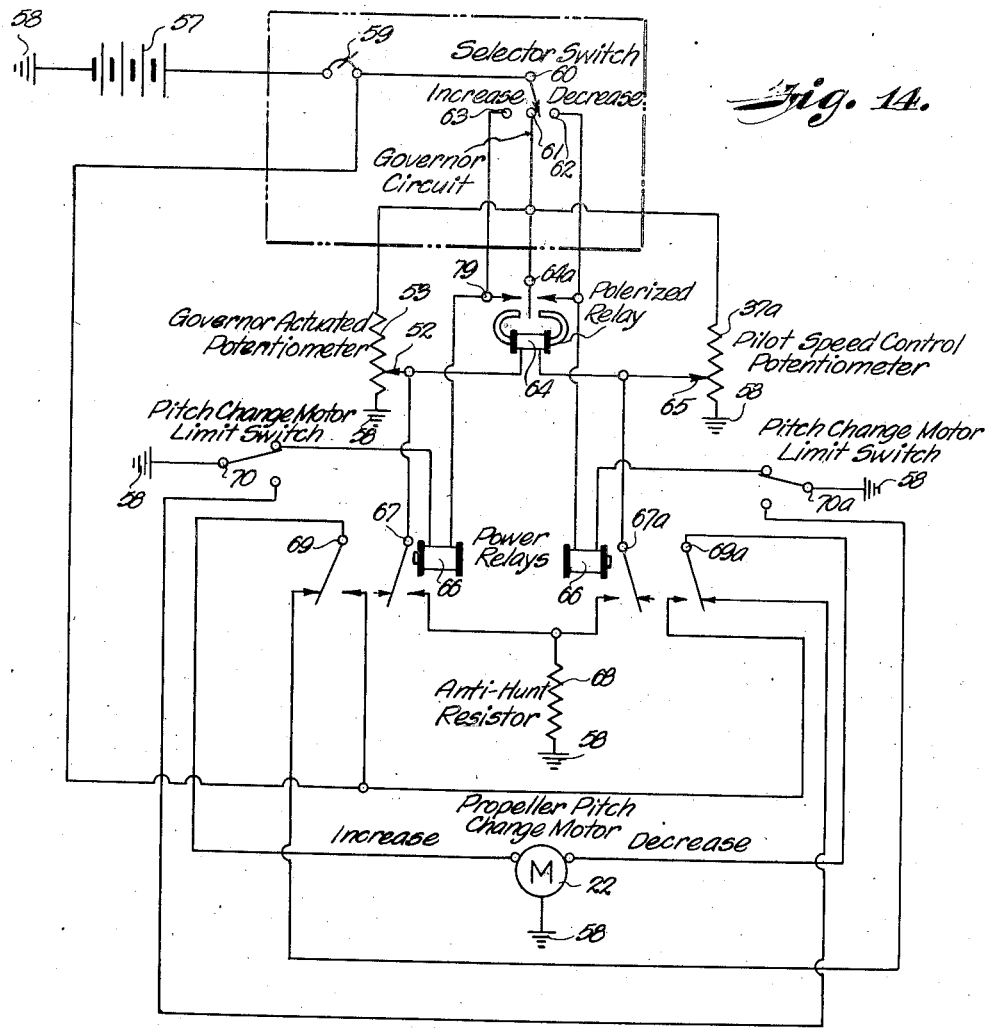
Figure 15:
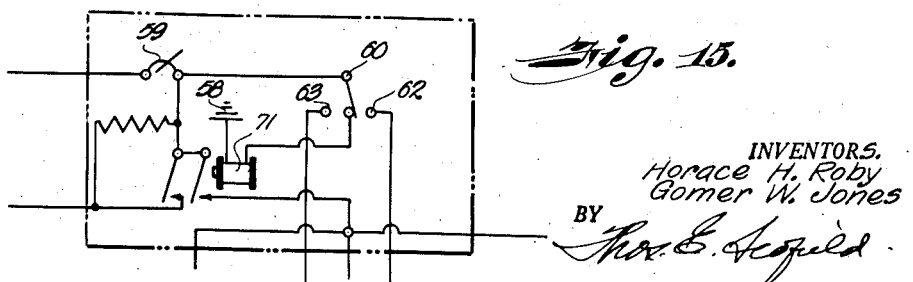
Figure 16:
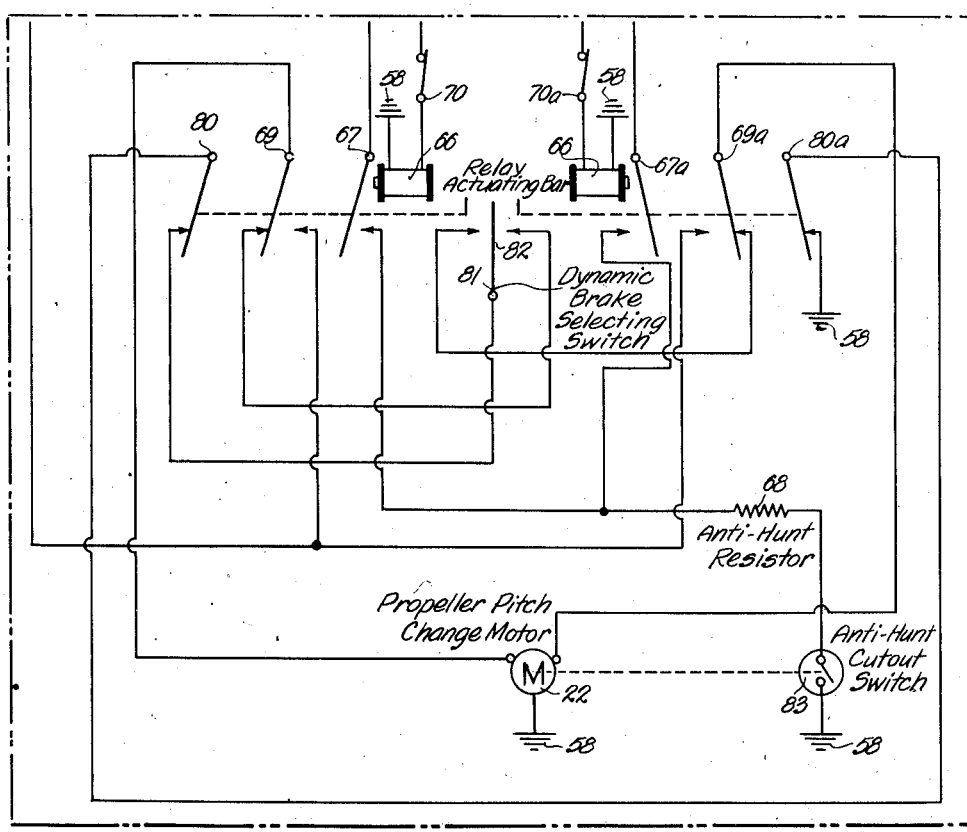

In the accompanying drawings which form a part of the instant specification and are to be read in conjunction therewith, and in which like reference numerals are used to indicate like parts in the various views, Fig. 1 is a diagrammatic view of the necessary mechanism for an electrically operated pitch control mechanism embodying the invention connected into a two-engine power unit, Fig. 2 is an enlarged elevational view of the cockpit control mounted on the pilot's instrument panel, Fig. 3 is an end elevation of the control shown in Fig. 2 with a portion of the end wall broken away, Fig. 4 is an enlarged plan detail of the worm and gear mechanism shown in Fig. 3, Fig. 5 is an end view of the mechanism shown in Fig. 4 indicating the manner in which the control rod is rotated to simultaneously increase and decrease engine speed, Fig. 6 is a similar view indicating the manner in which the control rod is shifted axially to synchronize the engine speed, Fig. 7 is an enlarged detail of the pitch change motor and its connections to the propeller and limiting switches, Fig. 8 is a view taken along the line 8—8 in Fig. 7 in the direction of the arrows, Fig. 9 is an enlarged sectional detail of the engine governor and governor actuated potentiometer assembly used on each motor, Fig. 10 is an enlarged perspective detail of the governor actuated potentiometer resistor arm, Fig. 11 is a view taken along the line 11—11 in Fig. 10 in the direction of the arrows, Fig. 12 is a view similar to Fig. 1 in which the necessary mechanism is shown for a single engine power unit, Fig. 13 is a view similar to Fig. 2 of the cockpit control for a single engine power unit, Fig. 14 is a wiring diagram of the circuit employed in the control mechanism of each engine, Fig. 15 is an alternate wiring diagram for the section within the lines in Fig. 14, and Fig. 16 is a modified wiring diagram for connection into the system shown in Fig. 14 at the polarized relay.

Referring to the drawings and particularly Figs. 1 and 12, at 20 are diagrammatically shown in dotted lines propeller hubs enclosing mechanism essential to varying the pitch on blades 21. This pitch is increased or decreased by the reversible pitch change motors 22 which through shafts 23 rotate pinions 24 which mesh with the pitch change gears 25. The speed of the pitch change motors 22 is reduced through a system of gears enclosed within casing 26 shown in Fig. 7. The drive shafts for pinions 24 have interposed therein universal connections also indicated in Fig. 7.

The cockpit control mounted on the instrument board and manually operated from the pilot's seat is diagrammatically shown at 27 in Figs. 1 and 12, and detailed in Figs. 2, 3, 4, 5, 6 and 13. The control is enclosed within a housing 27a with a front panel 27b for the twin engine unit shown in Fig. 2, and 27c for the single engine unit shown in Fig. 13. A shaft 28 is supported within the control housing on a front bearing 29 and a rear bushing 30. Mounted on the shaft 28 in the twin engine unit are fixedly mounted worm gears 31. In the single engine control the potentiometer is controlled direct without gearing. Fixedly attached to the end of shaft 28 outside of panel 27b is an indicator 32 whose hand may be adjusted by rotation in either direction to increase and decrease the engine speed as will hereinafter be explained. Bushing 30 which is rotatably mounted on shaft 28 has a hub portion externally threaded to engage threads cut in the panel and in a plate 33 attached to the panel within the control housing. A knurled disk 30a integral with bushing 30 and of greater diameter than the threaded hub facilitates rotation of the bushing 30. A collar 34 pinned to shaft 28 forms an abutment for the forward end of the bushing causing the shaft to be shifted axially when the bushing is screwed into the housing. When the bushing is screwed in the opposite direction the outer face of knurled disk 30a abuts against indicator 32 shifting the shaft rearwardly limited by abutment of collar 34 with plate 33. Abutment of the opposite end of the shaft with the housing limits axial movement in the forward direction. It will be seen from the above that rotation of shaft 28 in either direction by indicator handle 32 rotates worm gears 31 causing the gears 35 on the shafts 36 of the pilot's speed control potentiometers 37 to rotate in the opposite direction as shown in Figs. 4 and 5. Manual rotation of threaded bushing 30 by knurled disk 30a in either direction shifts shaft 28 and worms 31 axially as indicated in Fig. 6, rotating potentiometer gears 35 in the same direction, thus affording two types of control by the single shaft as will hereinafter be explained.

The construction of the fly ball governor driven from the engine shaft and the potentiometer which it actuates is detailed in Figs. 9, 10 and 11. The governor and potentiometer are enclosed in a housing 38 externally threaded at 38a to receive the coupling of the flexible shaft which drives tachometers 39 shown diagrammatically in Figs. 1 and 12. Closure plate 38b is internally threaded to receive a coupling connected to the engine tachometer pad. Shaft 40 of the governor is supported in ball bearings carried by the closure. The fly ball governor mechanism, including actuating arms 41, are pivoted centrally to shaft 40. The weighted ends of the governor are connected by links 42 to a spring housing 43 which is axially movable along shaft 40. Spreading of the governor weights due to increased engine speed moves the housing rearwardly. Reduction of engine speed and retraction of the governor weights toward the shaft shifts the housing 43 forward. On the back of the housing is a plate 43a against which contacts a shoe 44. This shoe is attached to resistor arm 45 which is pivoted at 46 to a stub shaft mounted upon bearing supports 47. Below the pivot is an eye 48 into which is hooked one end of the tension spring 49, the other end being attached to screw bolt 50 threaded into the side of the housing. Attached to the upper end of the resistor arm 45 and insulated therefrom is a claw extension 51 which holds brush 52 of the governor actuated potentiometer. Coil 53 of the potentiometer is in the form of an arc held upon a support within the housing. A cross sectional view of the potentiometer brush 52 is shown in Fig. 11. It will be noted that the surface of the brush which contacts the coil is crowned or centrally ridged to give a rolling contact at a very limited section of the coil. The forward end of the compression spring 54 surrounding shaft 40 is enclosed within and abuts housing 43. The opposite end of the spring abuts a sleeve 55 which is adjustable axially on the shaft by a nut and lock nut assembly 56 threaded to the shaft behind the sleeve. The compressive force imposed upon the spring by its restriction between the sleeve and housing constantly urges the housing forward. As the housing is moved rearwardly against the force of the compression spring, rear plate 43a contacts shoe 44 rotating resistor arm 45 on its pivot shifting the brush 52 of the potentiometer across the arcuate shaped coil 53. With speed reduction, housing 43 moves forward relieving rearward pressure upon the shoe permitting coil spring 49 to take effect and rotate the resistor arm back across the arc of the potentiometer coil to a position shown in Fig. 9.

The wiring circuit by which the reversible propeller pitch change motor 22 is driven is shown in Fig. 14. The electrical power source is diagrammatically indicated as a battery 57 which is grounded at 58 and is connected through a circuit breaker 59 to a selector switch 60. Aircraft having multiple motor power units would have a circuit such as that shown in Fig. 14 for each power unit. Selector switch 60 is a four way switch manipulated by a handle shown in Fig. 3. In the central position the motor circuit is interrupted. When the switch handle is pushed upward, terminal 61 is contacted and the governor actuating circuit is closed. When the switch handle is pushed downwardly and to the right terminal 62 is contacted which eliminates the governor actuated circuit operating the pitch change motor to increase pitch by manual control. When the selector switch handle is pushed downwardly and to the left, terminal 63 is contacted also eliminating the automatic governor actuated circuit and reversing the motor to decrease by manual operation the propeller pitch.

Connected in the automatic governor actuated circuit is a polarized relay diagrammatically shown at 64. On one side of the relay is the governor actuated potentiometer coil 53 contacted by its brush 52. On the opposite side of the relay is the pilot speed control potentiometer 37 comprising a coil 37a contacted by a brush 65. Both of the potentiometer coils are grounded at 58. Connected into both the governor circuit and the circuits by which the reversible pitch change motor 22 is manually operated are power relays 66. These relays when energized separately operate switches 67 and 67a which cut in an anti-hunt resistor 68 and switches 69 and 69a which drive the motor 22 to increase or decrease propeller pitch.

The alternate wiring diagram shown in Fig. 15 includes a power relay 71 in the governor actuated circuit ahead of the polarized relay 64. The alternate wiring serves to decrease the R. P. M. of the pitch change motor 22 when manual control is being used. It is automatically cut out of the circuit by the selector switch 60 when it is moved to its constant speed position. Limit switches 70 and 70a are interposed in the motor circuit to stop the motor as the propeller blades reach their extreme pitch position.

The mechanism for operating the limiting switches will be found in Figs. 7 and 8. From a worm or spiral gear 72 mounted on shaft 23 and meshing with a pinion 73 is driven a stub shaft 74 supported on bracket 75. Also mounted on the stub shaft with pinion 73 are a pair of cams 76, one controlling the motor rotation in one direction, the other controlling the rotation in reverse. The periphery of the cams contact rollers 77 carried by brackets 78 which are mounted upon limit switches 70 and 70a. The switches are connected into the circuit by suitable conductors diagrammatically shown in Fig. 7. The peripheries of the two cams 76 are circular except for one flattened side shown at 76a in Fig. 7. While switch rollers 77 are operating against the circular portion of the cam the circuits remain closed. When on the flattened portion the respective circuits are openeid. The cams are so adjusted with the pitch change mechanism as to open the circuits at the extremities of the pitch changing cycle.

The electrically operated propeller pitch control hereinbefore described causes the propeller blades to assume automatically the requisite pitch angle for a given engine speed under all flight conditions. The device claims distinction over other controllable pitch propeller mechanisms in its unique electrical circuit and governor arrangement for varying the constants in the circuit to obtain electrical control of the revolutions per minute of the propellers.

The control, as has been indicated, consists of a pitch change motor whose starting circuit is controlled by power relays which in turn are responsive and subject to a small sensitive polarized relay 64. This polarized relay is operated in a bridge circuit in which the polarized relay coil is connected to the center tabs or brushes of two potentiometers and uses the unbalanced current that flows from one potentiometer to the other as its energy. One side of the potentiometer resistance windings are connected to the hot side of the buss or power source and the opposite sides of the resistance to ground. The polarized relay then operates the power relays 66 that control the propeller pitch change electric motor 22. When there is no current flowing from one potentiometer to another the polarized relay does not operate, indicating the propeller is rotating at the desired speed with proper pitch.

One of the potentiometers 37 of each engine circuit is located on the instrument panel in the airplane cockpit and is used by the pilot with manipulation of indicator 32 to select the desired propeller speed of his power unit or units. The other or governor actuated potentiometer 53 is operated by a fly ball governor 38. The circuit is wired as shown in Fig. 14 so the pitch of each propeller is altered to vary the speed of the engine so the fly ball governor will make its potentiometer match the resistance of the pilot speed control potentiometer in the cockpit.

In order to reduce the starting friction of the brush used in the governor potentiometer the special type wedge-faced rocking brush, such as is shown at 52 in Fig. 11, is employed. The limited surface contact which this brush has with the coil reduces the starting friction and also gives a mechanical advantage in the movement of the brush along the coil. The brush also makes a large amount of resistance change with a small amount of brush movement.

Propeller pitch on each propeller may be altered by manipulation of switch handles 60. The switches have four positions permitting the operator to select the governor circuit or he may choose to control the pitch by operating the motor directly through the manual circuits and eliminate the polarized relay with its associated potentiometers and other automatic controls.

Because of the coast of the pitch change motor an anti-hunt circuit is provided. This anti-hunt circuit consists of a parallel resistance 68 connected between the brush and ground connection of the potentiometer which has the highest value of resistance between its brush and ground while the propeller pitch change motor is running. This anti-hunt resistor is cut into the circuit by an additional set of contacts 67 and 67a on the power relays 66 which operate the pitch change motor 22. Thus when a power relay is energized and the circuit closed the resistor 68 is connected into the circuit. When the unbalance between the potentiometers 37a and 53 is great, the polarized relay 64 has one set of its contacts closed. When the unbalance between the potentiometers is small the anti-hunt resistor 68 in the circuit causes the unbalance to disappear and the polarized relay points open, thereby removing the anti-hunt resistor from the circuit. If the unbalance recurs the cycle is repeated. The employment of the anti-hunt resistor causes the pitch change motor to run very slowly while the unbalance between the potentiometers is small, reducing the coast of the pitch change motor to a minimum when the propeller closely approaches the desired governing speed.

The single engine control shown in Fig. 13 consists of a circuit breaker, polarized relay, and engine governor with its potentiometer and a pilot speed control potentiometer. The twin engine control shown in Figs. 2 and 3 has two circuit breakers, two polarized relays, two governor actuated potentiometers and two pilot speed control potentiometers actuated from two manual switches. The pilot speed control potentiometers are so arranged that by turning one control knob 32 the pilot may control the speed of his engines and by turning knurled disk 30a he may synchronize the engines. The control permits not only synchronization of the two engines, but he may maintain any differential speed between the engines if he so desires.

To clarify the operation of the anti-hunt circuit further explanation is probably in order and an example of how it functions will be given. In brief, the fly ball governor actuates a potentiometer which is part of a Wheatstone bridge circuit which employs a polarized relay 64 in place of the galvanometer normally used. Two potentiometers 37a and 53 are used for the four resistance legs, the brushes of the potentiometers varying the value of the resistance in the different legs of the bridge circuit. The anti-hunt circuit of the control is a resistance 68 which parallels one of the legs of resistance between a potentiometer brush and the potentiometer ground.

As an example of how the anti-hunt circuit works, refer to the wiring diagram of Fig. 14. Assume the resistance of the potentiometer coils 53 and 37a is 50 ohms and the resistance between the brushes 52 and 65 and the ends of the potentiometer coils to be 25 ohms each, and the resistance in the anti-hunt resistor 68 is 100 ohms. Since the polarized relay circuit is substantially a Wheatstone bridge circuit, when the resistance ratio between the brushes and the ends of the potentiometer coils is the same, no current will flow from one brush to the other through the polarized relay 64. Assuming now that the pilot changes the speed control indicator 32, the resistance on opposite sides of brush 65 is no longer equal, but now becomes 30 ohms above the brush and 20 ohms between the brush and ground. Since the resistance in the potentiometer coil 53 on opposite sides of brush 52 is 25 ohms, current will flow between the brushes and the polarized relay will actuate its switch 64a closing the circuit at contact 79. This in turn actuates one of the power relays 66 closing switches 67 and 69 which starts the pitch change motor in the increase direction and also connects resistor 68 in parallel with the governor actuated potentiometer. The resultant resistance is exemplified by the equation $$\frac{1}{25}+\frac{1}{100}=\frac{1}{20}$$

or 20 ohms. The ratio of the resistance in the governor actuated potentiometer now therefore becomes $$\frac{25}{20}=1.25$$

and the ratio of the resistance in the pilot control potentiometer 37a is $$\frac{30}{20}=1.5$$

Since the ratio of the resistance in the pilot control potentiometer 37a is greater than the ratio of resistance in the governor actuated potentiometer 53 the current will flow from the latter to the former and the polarized relay switch will remain closed with contact 79. This switch will remain closed until the governor moves the brush 52 to a point on the potentiometer coil 53 where the resistance ratio on opposite sides of the brush, plus the value of resistor 68 which is now connected in parallel, will equal 1.5 or the resistance which exists in potentiometer 37a. In other words, the governor will have to move brush 52 to a point on the resistance coil where resistance above the brush equals 27 ohms and resistance between the brush and ground plus the value of resistor 68 equals 18 ohms. At this point the resistance in the two potentiometers will again be equalized, no current will flow between the brushes and the polarized relay will become de-energized. The polarized relay switch 64a will then again open the circuit and stop the motor.

The resistance above brush 52 in the governor actuated potentiometer expressed in ohms will be 50−27=23 ohms because when the polarized relay actuated switch 64a opens, the anti-hunt resistor 68 is eliminated from the circuit. With resistance ratios in potentiometer 53 on opposite sides of the brush 27 ohms and 23 ohms a relationship exists as $$\frac{27}{23}=1.173$$

while the ratio in the pilot control potentiometer 37a remains $$\frac{30}{20}=1.5$$

as above indicated. Under these conditions the polarized relay is again energized connecting resistor 68 back into the circuit in parallel with the resistance in the governor actuated potentiometer. When the anti-hunt resistor is connected in parallel with the resistance in the potentiometer 53 the polarized relay is again de-energized and switch 64a is opened at which time the anti-hunt resistor is again eliminated from the circuit. Thus, each time the polarized relay is actuated by current flow between the potentiometer brushes the pitch change motor makes a small change of the propeller pitch. Anti-hunt resistor 68 is cut in and out of the circuit in this manner by the polarized relay 64 until the governor moves brush 52 to a point on the potentiometer coil where the resistant ratios on both sides of the brush correspond to the resistance ratios on both sides of the brush of the pilot control potentiometer 37a.

If each ohm of resistance in the potentiometers equals 20 R. P. M. of the pitch change motor the motor will run continuously until the engine and propeller R. P. M. only varies 60 R. P. M. from the governed R. P. M., then the pitch change motor runs in short steps approaching the governed speed because anti-hunt resistor 68 is cut in and out of the circuit at this point until the engine and propeller are running at the governed speed. Expressed in terms of ohms, resistance existing on the potentiometers and assuming each ohm has 20 R. P. M. the (30 ohms−27 ohms)×20=60 R. P. M.

By changing the value of the resistor 68, the anti-hunt circuit may be made to start operating at practically any R. P. M. to prevent the governor system from hunting.

The circuit shown in Fig. 14 will operate satisfactorily without the electric cables or conductors which connect contacts 69 and 69a to 70 and 70a, respectively. These cables function only in the dynamic braking of the propeller pitch change motor when the propeller blades have reached their limit of travel.

In the modified wiring diagram shown in Fig. 16, the hookup with the power relays 66 is much the same. Switches 67, 67a, 69 and 69a function as in the system shown in Fig. 14. In addition to these switches there have been added to the power relays two additional switches 80 and 80a which are actuated simultaneously with the other two switches of the relay to which it belongs to dynamically brake pitch change motor 22. Dynamic braking of the motor instantly stops the pitch change motor at any time when both relays are in an off position as shown in the figure. This assists the anti-hunt by cutting down the extent of coasting of the pitch change motor and permits the motor to run at its full speed much closer to the propeller governing speed. Thus it will be seen with dynamic braking the anti-hunt circuit does not need to cut in and slow down the pitch change motor as soon as it does with the circuit shown in Fig. 14. A dynamic brake-selecting switch 81 which operates the relay actuating bar 82 functions simultaneously with the switches of the respective relays. Connected to motor 22, anti-hunt resistor 68 and ground 58 is an anti-hunt cutout switch 83. This switch cuts out the anti-hunt resistor 68 from the governor circuit when the pitch change motor is at rest. It cuts in the anti-hunt resistor when the pitch change motor armature has attained any preselected speed and holds the motor at that speed until (a) The desired propeller speed is obtained at which time the pitch change motor stops,
(b) The propeller speed is enough different from the governing speed that the polarized relay overrides the anti-hunt resistor when the pitch change motor operates at its full R. P. M.

This anti-hunt cutout switch 83 offers the advantageous feature that the pitch change motor may develop full power when it is making even a small correction in the pitch setting of the propeller blades.

From the foregoing the advantages of the control will be obvious from an operating standpoint. The simplicity, small size, light weight, low cost and use of standard parts available on the open market are also of importance. All parts used with the exception of the fly ball governor and its potentiometer and the box used to house the cockpit control are standard on the single engine control unit. With respect to the twin engine control the only part not standard, in addition to those indicated in the single engine control, is the worm gear arrangement used to manipulate the potentiometers. The circuit for the single engine control and twin engine controls are the same with the simple connection between the two being the dual control spiral gear arrangement on the pilot control potentiometer. It will be noted also that the governors are driven from the conventional tachometer couplings of the engines and each governor has a tachometer take-off incorporated therein. This eliminates the necessity of a special take-off pad on the engines to drive the governors. The governor also may be used with any mechanically operated propeller equipped with pitch change mechanism capable of being actuated in flight by electric, hydraulic or manual means.

From the foregoing it will be seen that the invention is one well adapted to attain all of the ends and objects hereinabove set forth together with other advantages which are obvious and which are inherent to the control.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. In an electrically operated pitch control mechanism, the combination with a propeller driving by a prime mover, a governor operated by the prime mover, mechanism for varying the pitch of the propeller blades, a reversible motor having operable connections with the pitch-changing mechanism, a source of electric power for driving the motor, conductors connecting the power source with the motor including an automatic motor control circuit simulating a Wheatstone bridge in which a polarized relay is substituted for the galvanometer of the bridge and two potentiometers replace the resistant legs of the bridge, a manual speed control device operable from the pilot's seat for varying the resistance in one potentiometer, the prime mover governor connected to and adapted to vary the resistance in the other potentiometer whereby adjustment of the manual speed control device altering resistance in its potentiometer creates an unbalance within the motor control circuit closing the circuit and operating the motor to increase or decrease propeller pitch, thereby coordinating the resistance in the governor operated potentiometer in accordance with the potentiometer regulated from the pilot's seat, and an anti-hunt resistor in the motor control circuit adapted to parallel one of the legs of resistance between a potentiometer and ground 2. In an electrically operated pitch control mechanism, the combination with a propeller driven by a prime mover, a governor operated by the prime mover, mechanism for varying the pitch of the propeller blades, a reversible motor having operable connections with the pitch-changing mechanism, a source of electric power for driving the motor, conductors connecting the power source with the motor including an automatic motor control circuit simulating a Wheatstone bridge in which a polarized relay is substituted for the galvanometer of the bridge and two potentiometers replace the resistant legs of the bridge, a manual speed control device operable from the pilot's seat for varying the resistance in one potentiometer, the prime mover governor connected to and adapted to vary the resistance in the other potentiometer whereby adjustment of the manual speed control device altering resistance in its potentiometer creates an unbalance within the motor control circuit closing the circuit and operating the motor to increase or decrease propeller pitch, thereby coordinating the resistance in the governor operated potentiometer in accordance with the potentiometer regulated from the pilot's seat, and an anti-hunt resistor automatically interposed in the motor control circuit responsive to the unbalancing of the circuit.

HORACE H. ROBY.
GOMER W. JONES.

REFERENCES CITED

The following references are of record in the file of this patent:

UNITED STATES PATENTS

| Number | Name | Date |
|---|---|---|
| 1,374,787 | Walker | Apr. 12, 1921 |
| 2,025,218 | Reinken | Dec. 24, 1935 |
| 2,155,586 | Ebert | Apr. 25, 1939 |